United States Patent [19]

Guell

[11] Patent Number: 5,504,965
[45] Date of Patent: Apr. 9, 1996

[54] ELECTRICALLY HEATED WIPER BLADE UTILIZING SPIRAL COILED RESISTER WIRE

[76] Inventor: Ronald R. Guell, N. 4997 Summit Dr., Fond Du Lac, Wis. 54935

[21] Appl. No.: 356,727

[22] Filed: Dec. 15, 1994

[51] Int. Cl.⁶ ....................................... B60S 1/38
[52] U.S. Cl. ...................... 15/250.06; 15/250.48; 318/739
[58] Field of Search ............. 15/250.06, 250.05, 15/250.07, 250.08, 250.09, 250.48; 318/202

[56] References Cited

U.S. PATENT DOCUMENTS

| | | | |
|---|---|---|---|
| 1,885,710 | 11/1932 | Gentry et al. | 15/250.09 |
| 1,980,254 | 11/1934 | Cartwright | 15/250.06 |
| 2,100,019 | 11/1937 | Wilson | 15/250.06 |
| 2,194,671 | 3/1940 | Pauro | 15/250.06 |
| 2,422,761 | 6/1947 | Ungerland | 15/250.06 |
| 2,656,448 | 10/1953 | Lentz | 15/250.06 |
| 2,865,040 | 12/1958 | Hamm | 15/250.06 |
| 2,903,732 | 9/1959 | Taylor et al. | 15/250.06 |
| 3,249,959 | 5/1966 | Theckston | 15/250.06 |
| 4,152,808 | 5/1979 | Andregg | 15/250.07 |
| 4,360,941 | 11/1982 | Mable | 15/250.06 |
| 4,497,083 | 2/1985 | Nielsen, Jr. et al. | 15/250.06 |
| 5,325,561 | 7/1994 | Kotlar | 15/250.06 |
| 5,426,814 | 6/1995 | Minnick | 15/250.06 |

FOREIGN PATENT DOCUMENTS

| | | | |
|---|---|---|---|
| 820156 | 7/1937 | France | 15/250.06 |
| 253617 | 12/1948 | Switzerland | 15/250.06 |

*Primary Examiner*—Gary K. Graham

[57] ABSTRACT

A heated windshield wiper blade unit suitable for incorporating into existing or new windshield wiper assembly. The blade comprises a spiral coiled heating element of resistance wire, such as Nichrome, disposed in the blade substantially along its entire length within a passageway. A stranded copper line wire and a ground wire enter the blade to establish electrical contact with the respective first and second ends of spiral coiled heating element which serves to conduct heat to entire wiper blade assembly so as to prevent accumulation of ice, sleet or snow on the wiper blade. The ends are then sealed with a moisture proof sealant which also serves to maintain end connectors and wires in tact.

2 Claims, 1 Drawing Sheet

U.S. Patent     Apr. 9, 1996     5,504,965
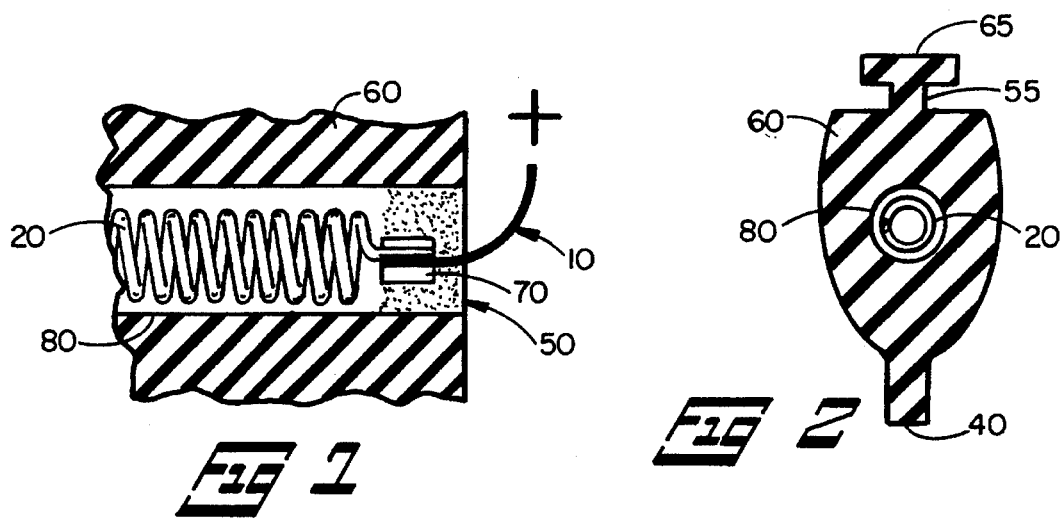
FIG. 1
FIG. 2
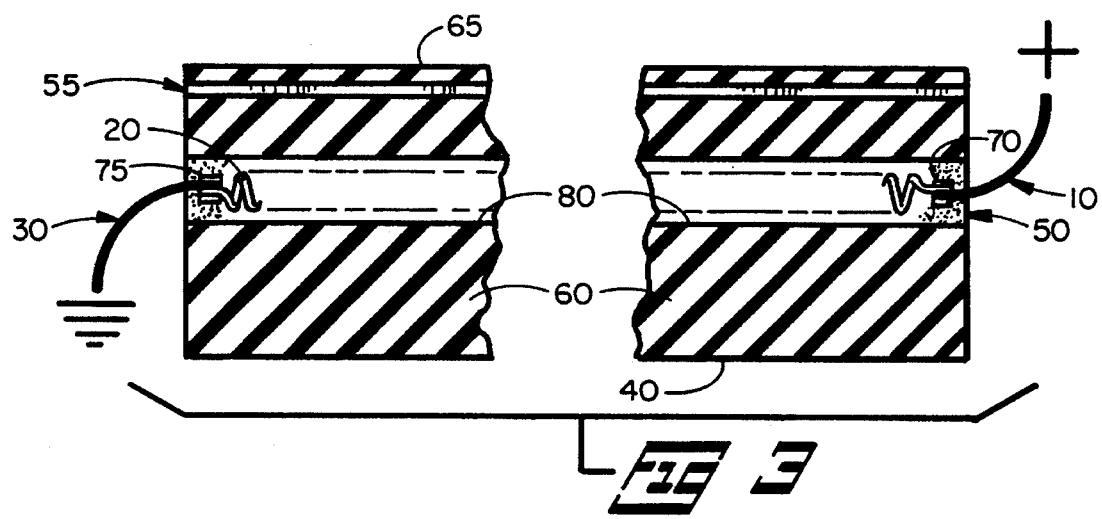
FIG. 3
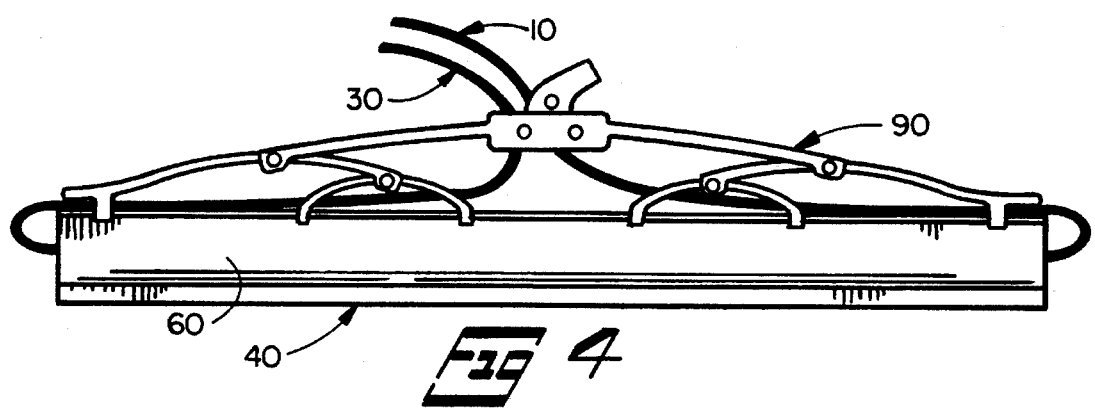
FIG. 4
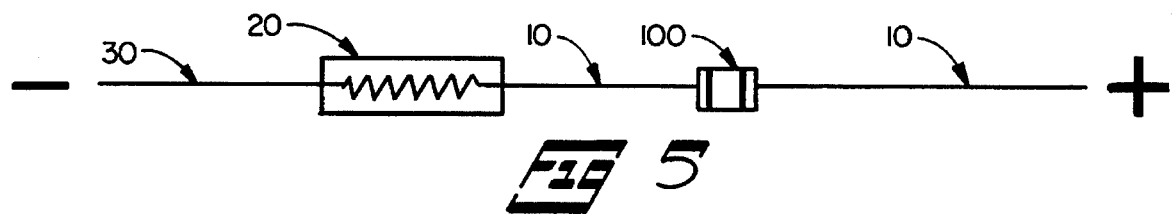
FIG. 5

ELECTRICALLY HEATED WIPER BLADE UTILIZING SPIRAL COILED RESISTER WIRE

FIELD OF THE INVENTION

This invention relates generally to heated wiper blade units. More particularly this invention relates to a wiper blade heating element suitable for incorporating into new or existing wiper blade.

BACKGROUND OF THE INVENTION

When a vehicle is operated during blizzard, snow, sleet, or other icy conditions, precipitation may not be cleared away because the wiper blade becomes encrusted with ice and snow build-up, whereupon the blade is pushed away from the glass by said build-up. The vehicle defroster is incapable of heating the windshield sufficiently to melt the ice forming on the blade and its associated mountings. When ice builds upon the wiper blade, the wiper blade edge no longer has contact with the windshield. Thus the blade cannot perform the intended function of wiping precipitation from the windshield ultimately severally reducing visibility and safety.

There have been a variety of attempts to improve the wiping action of a windshield wiper to clean the outer surface of a windshield in cold weather.

U.S. Pat. No. 4,152,808 discloses a heating element 0.125" wide and 0.005" thick embedded in the sides of a frame adapted to receive a wiper blade. In the upward direction, heat is transferred to the frame and linkage elements. In the downward direction, heat is transferred from the element to the frame, from the frame through a gap in the wiper body carrying the blade and finally down to the blade. In the outward lateral direction, heat is transferred to the surrounding air and essentially wasted. This indirect heating method is accordingly ineffective, inefficient, and limits the flexibility of the blade, thereby inhibiting the blade wiping action.

U.S. Pat. No. 4,497,083 discloses a heated windshield wiper blade having a resistance wire running along the length of the wiper arm, the blade carrier and the wiper blade to heat the blade and the carrier when it is connected to a vehicle's electrical system. The path through which the resistance wire travels and its various connections is quite complex in order to provide the blade with heat.

U.S. Pat. No. 4,360,941, discloses a second, rather complex windshield wiper assembly which incorporates a weather protective hood utilizing electrical conductors affixed on the outer wall of the hood and other conductors affixed on the inner wall of the hood to heat the hood and frame to prevent the accumulation of ice.

U.S. Pat. No. 5,325,561 discloses an unnecessarily complex and inefficient circuitry system. The heating element consists of straight wire which is less than ⅓ of the width of the passageway. Thus the heating element can lie on the passageway causing hot spots and decreasing efficiency and causing blade damage. The probability of a thin straight wire is more prone to breakage or failure.

The devices disclosed in the aforementioned patents leave much to be desired from the standpoint of simplicity of construction, or are not sufficiently flexible to be used with windshields of any desired lateral or longitudinal curvature; some blade designs cause extremely localized heating placing undue thermal stress on the material of the blade. Some require specialized wiper blade frames and/or wiper arm assemblies.

Accordingly, it is an object of the present invention to provide a simple, low cost wiper blade assembly which is not fatigued by the repeated stresses of recipocation, and is easy to replace and install.

It is a further object of this invention to provide flexible heated wiper blade element suitable for incorporation into new or existing wiper assembles, and able to adapt to use on windshields having most any lateral or longitudinal curvature.

It is yet a further object of this invention to provide a heated wiper blade which permits the wiper blade to conform to the shape of the windshield under snow, sleet or other icy conditions. Thus providing satisfactory wiping performance, while simultaneously removing and keeping the wiper blade, frame and linkage free from interference by ice and snow.

SUMMARY OF INVENTION

The principle object of the present invention is to provide a sufficiently heated wiper blade adapted to be mounted on an existing or new wiper arm which sweeps across a windshield or other surface to be wiped clear, such as rear window or head light. The assembly includes an elongated wiper blade formed of heat resistant resilient material and a blade carrier.

The wiper blade includes a hollow horizontal passageway extending the entire length of the wiper blade in which a spiral coiled heating element is placed. Each end of the spiral coiled heating element terminates at connectors located at ends of passageway within the wiper blade body. A live stranded copper wire is securely crimped to first end connector of the spiral coiled heating element and a stranded copper wire is securely crimped to the second end connector of the spiral coiled heating element. The passageway is sealed on each end with a waterproof sealant.

Electric power is supplied to the spiral coiled heating element from the vehicle's existing power supply in any currently known manner using a simple circuitry system. The circuitry is basically a positive lead wire connected to the heating element. The spiral coiled heating element also connects to a ground wire. Simply stated current passes through the heating element, the element heats, and the heat is conducted into the body of the wiper blade thereby heating the blade assembly.

Field testing of this invention has proven successful in providing satisfactory wiping performance while simultaneously removing and keeping the wiper blade, frame and linkage free from interference by ice, sleet, or snow with no apparent deterioration of the blade, wiping performance, or heating element. Secondarily field testing also indicates that road film in all weather is removed more effectively and thoroughly if the blade squeegee is heated when used in conjunction with a windshield solvent cleaner.

BRIEF DESCRIPTION OF THE DRAWINGS

FIG. 1 is an exploded fragmentary view illustrating the live wire making electrical contact with the spiral coiled heating element within connector and sealant.

FIG. 2 details an enlarged cross sectional view of wiper blade illustrating spiral coiled heating element within the passageway.

FIG. 3 illustrates an enlarged perspective view of an exposed portion of wiper blade unit exposing the passageway and it's content.

FIG. 4 illustrates position of lead and ground wires upon the support spine beneath the wiper blade carrier clips, after which the wires enter the passageway at wiper blade assembly ends.

FIG. 5 is a schematic of heating element circuitry.

DETAILED DESCRIPTION OF THE PREFERRED EMBODIMENT

Referring now in greater detail to the various figures of the drawings wherein like reference characters refer to like parts. There is shown in FIG. 4 a heated wiper blade. The complete system basically comprises a wiper blade assembly 60 fitted onto the blade carrier 90. As shown in FIGS. 1, 2, and 3 passing through the wiper blade assembly 60 is a spiral coiled heating element 20 which heats the wiper blade assembly 60 and parts of the lower blade carrier 90.

The wiper blade carrier 90 is connected to a wiper arm (not shown) and motor (not shown) which causes the wiper blade edge 40 to squeegee across the windshield or area to be wiped clear in a conventional manner.

In FIG. 4, the elongated support spine 45 is positioned upon the wiper blade assembly 60. The support spine 45 is part of the wiper blade assembly 60 that slides through the wiper assembly head clips 35 of wiper blade carrier 90 when assembling or removing wiper blade assembly 60.

The support spine 45 material is of a hard resilient plastic or metal as to prevent clips 35 of wiper blade carrier 90 from pulling free of wiper blade assembly 60. Line wire 10 and ground wire 30 are held upon the support spine 45 by positioning said wires under wiper blade assembly clips 35.

In FIG. 2 a cross section of heated wiper blade assembly 60 connects to wiper blade top head 65 by a flexible intergral hinge 55 constructed as one unit. Wiper blade body 60 contains passageway 80. The passageway serves to entomb spiral coiled heating element 20.

The wiper blade assembly 60 comprises an elongated extrusion of a flexible resilent material which can withstand temperatures in excess of 200° F. Such materials maybe neoprene or silicone rubbers, but other suitable materials may be used. The blade assembly 60 includes a hollow horizontal passageway 80 extending the entire length of the wiper blade assembly 60. As shown in FIG. 3 the passageway 80 extends from one end to the other end of the wiper blade assembly 60.

The passageway 80 serves to receive the elongated spiral coiled heating element 20 which consists of resistance wire such as Nichrome. The passageway 80 also serves as a means for inserting the spiral coiled heating element 20 into the body of the wiper blade assembly 60.

Live wire 10 and ground wire 30 consist of stranded copper wire.

The spiral coiled heating element 20 is positioned within the passageway along with identical end connectors 70 and 75, a live wire 10 and a ground wire 30 are securely crimped to end connectors 70 and 75 of the spiral coiled heating element 20.

FIGS. 1 and 3 show the passageway 80 sealed on both ends injected inward approximately ⅜ inch with a waterproof sealant 50 such as Dap manufactured by Dow Chemical. The waterproof sealant 50 seals the passageway 80 so as to prevent movement of spiral coiled heating element 20, live wire 10, ground wire 30 and end connectors 70 and 75, at the ends of the passageway 80 and also allows for an air tight passageway 80 with spiral coiled heating element 20 to be moisture free. The spiraling of the spiral coiled heating element 20 allows the wiper blade assembly 60 to remain sufficiently flexible to be used with windshields of any lateral or logitudinal curvature. The spiral coiled heating element 20 has enough spring elasticity as to not allow it to suffer fatigue because of the stresses of the normal wiper operation.

The spiral coiled heating element 20 with an outside diameter of approximately ⁵⁄₆₄" (0.078) and approximately ten coils per inch is positioned between connectors 70 and 75. In passageway 80 ⅛" (0.125) diameter.

For example, the process of coiling sixty-six inches resistance wire of 0.0226 diameter inches with a total resistance of 7.25 OHMS (1.272 OHMS per foot) and a draw of 1.55 AMPS within the confines of a twenty inch blade provides sufficient even heating throughout the blade length in all directions including downward to wiper blade edge 40, outward to and including sealant 50 and upward into most parts of lower wiper blade carrier 90.

Length of Nichrome wire used during wiper blade manufacturing changes according to blade length. Total OHMS of resistance and amperage draw changes are necessary for each specified blade length to maintain the proper heating level of 100° F.–130° F. However different guage resistance wire can also be used with its own specific calculation to meet respective heating needs.

Electric power is supplied to the spiral coiled heating element 20 from the vehicles existing power supply. The heating assembly may be connected to the electrical system of the vehicle in any known manner which will direct electrical current into and through the spiral coiled heating element 20.

FIG. 5 shows a simple wiring circuitry schematic. Live wire 10 source of power can be provided by the live wire of another cold weather accessory such as a heated mirror. While driving during inclement weather a heated mirror and heated wiper blade assembly 60 can be used simultaneously. Thereby utilizing the same on-off switch, lite indicator, and some of the same wiring.

Another source of power for live wire 10 is the cigarette liter receptical using an accessory plug adapter (not shown); or the live wire 10 could be wired directly to the vehicle power source using a separate on-off switch (not shown) with or without a temperature sensor thermostat (not shown) located away from the heated wiper blade to moniter the outside air temperature and would automatically turn on when outside air temperature drops below 35° F. and would shut off when outside air temperature rises above 35° F. This air temperature on-off switch is wired directly into ignition switch.

FIG. 5 illustrates the simplicity of the heating blade circuitry: a positive line wire 10 leads to a fuse holder 100 containing a 2 AMP fuse, leads to spiral coiled heating element 20 to ground wire 30.

I claim:

1. An electrically heated wiper blade comprising:
   a. a wiper blade carrier adapted to be connected to a windshield wiper arm;
   b. an elongated wiper blade assembly supported by and coupled to the wiper blade carrier, said wiper blade assembly comprises an elongate, resilient, flexible body having opposed first and second ends, said elongated body has an elongated passageway extending therethrough between the opposed ends thereof, said body has an opening at said first and second ends communicating with said passageway;

c. a flexible spiral coiled heating element having a hollow, open interior and first and second longitudinally extending ends and being loosely received in the passageway of the wiper blade assembly such that said first and second ends thereof lie within said passageway;

d. a first elongate electrical wire having a first longitudinally extending end extending inside the wiper blade assembly passageway and lying laterally beside said first end of said heating element;

e. a second elongate electrical wire having a first longitudinally extending end extending inside the wiper blade assembly passageway and lying laterally beside said second end of said heating element;

f. a first end crimped connector securing the first end of the heating element to the first end of the first wire inside the wiper blade assembly passageway;

g. a second end crimped connector securing the second end of the heating element to the first end of the second wire inside the wiper blade assembly passageway;

h. first and second seals of waterproof adhesive sealing, respectively, the openings in the body at the first and second ends of the wiper blade assembly to form a closed heatable air space therein, the first and second wires extending through the first and second seals, respectively.

2. The electrically heated wiper blade of claim 1 wherein:

a. the passageway of the wiper blade assembly is substantially cylindrical and has a diameter of approximately 0.125 inches; and b. the coiled heating element has an outer diameter of approximately 0.078 inches, so that the heating element provides maximum even heating to the wiper blade.

\* \* \* \* \*